United States Patent
Kukkola et al.

(10) Patent No.: US 11,204,079 B2
(45) Date of Patent: Dec. 21, 2021

(54) PLANETARY GEAR

(71) Applicant: Moventas Gears Oy, Jyväskyla (FI)

(72) Inventors: Teemu Kukkola, Jyväskyla (FI); Raine Lonnakko, Jyväskyla (FI)

(73) Assignee: MOVENTAS GEARS OY, Jyväskylä (FI)

( * ) Notice: Subject to any disclaimer, the term of this patent is extended or adjusted under 35 U.S.C. 154(b) by 0 days.

(21) Appl. No.: 16/787,600

(22) Filed: Feb. 11, 2020

(65) Prior Publication Data
US 2020/0263765 A1    Aug. 20, 2020

(30) Foreign Application Priority Data

Feb. 19, 2019    (EP) ...................................... 19158019

(51) Int. Cl.
*F16H 1/28*    (2006.01)
*F16H 57/08*    (2006.01)
(Continued)

(52) U.S. Cl.
CPC ................. *F16H 1/48* (2013.01); *F16H 1/32* (2013.01); *F16H 57/0031* (2013.01);
(Continued)

(58) Field of Classification Search
CPC ....... F16H 1/2836; F16H 1/48; F16H 57/0031
See application file for complete search history.

(56) References Cited

U.S. PATENT DOCUMENTS 2,498,295 A * 2/1950 Peterson ............... F16H 1/2836
475/347
2,501,034 A * 3/1950 Derbyshire ........... F16H 1/2836
475/346
(Continued)

FOREIGN PATENT DOCUMENTS

EP    0 054 280 A1    6/1982
EP    2 252 809 A1    11/2010
(Continued)

OTHER PUBLICATIONS

Extended European Search Report, issued in Priority Application No. 19158019.0, dated Sep. 6, 2019.
(Continued)

*Primary Examiner* — Sherry L Estremsky
(74) *Attorney, Agent, or Firm* — Birch, Stewart, Kolasch & Birch, LLP

(57) ABSTRACT

A planetary gear includes a planet carrier, a sun wheel, a gear ring, and planet wheels meshing with the sun wheel and with the gear ring. Each planet wheel shaft of the planetary gear is arranged to rotatably support a respective planet wheel so that, in an unloaded situation, a geometric axis of rotation of the planet wheel is skewed ($\alpha$) with respect to the axial direction (z) of the planetary gear. In a loaded situation, torque directed to the planet carrier causes twisting deformation in the planet carrier and thereby the skewedness of the geometric axis of rotation is at least partly eliminated by the twisting deformation. Thus, in the loaded situation, the direction of the geometric axis of rotation can be closer to the axial direction than in a planetary gear where there is no skewedness in an unloaded situation.

13 Claims, 4 Drawing Sheets

(51) Int. Cl.
*F16H 1/48* (2006.01)
*F16H 1/32* (2006.01)
*F16H 57/00* (2012.01)

(52) U.S. Cl.
CPC ... F16H 57/082 (2013.01); *F16H 2001/2881* (2013.01); *F16H 2001/325* (2013.01)

(56) References Cited

U.S. PATENT DOCUMENTS

| | | | | |
|---|---|---|---|---|
| 2,749,778 | A | * | 6/1956 | Kuhn ................... F16H 1/2809 475/347 |
| 2,848,908 | A | * | 8/1958 | Hollis ..................... F16H 3/64 475/279 |
| 3,303,713 | A | * | 2/1967 | Hicks ................... F16H 1/2836 74/411 |
| 5,102,379 | A | * | 4/1992 | Pagluica ............... F16H 1/2836 475/159 |
| 8,357,070 | B2 | * | 1/2013 | Duong .................... F16H 1/26 475/331 |
| 10,145,259 | B2 | * | 12/2018 | Sheridan .............. F16H 1/2836 |
| 2010/0240490 | A1 | | 9/2010 | Schafer |
| 2011/0053730 | A1 | * | 3/2011 | Fox ...................... F16H 57/082 475/347 |
| 2018/0051797 | A1 | | 2/2018 | Klein-Hitpass |

FOREIGN PATENT DOCUMENTS

| | | | |
|---|---|---|---|
| FR | 2 166 690 A5 | 8/1973 | |
| GB | 903210 A * | 8/1962 | ........... F16H 1/2836 |
| WO | WO 2009/102853 A1 | 8/2009 | |
| WO | WO 2009/106222 A1 | 9/2009 | |

OTHER PUBLICATIONS

European Office Action for European Applicaton No. 19 158 019.0, dated Mar. 29, 2021.

* cited by examiner

PLANETARY GEAR

FIELD OF THE DISCLOSURE

The disclosure relates to a planetary gear. Furthermore, the disclosure relates to a planet wheel shaft of a planetary gear and to a planet carrier of a planetary gear.

BACKGROUND

A planetary gear comprises a planet carrier, a sun wheel, a gear ring, and planet wheels meshing with the sun wheel and with the gear ring. The planet wheels are supported with planet wheel shafts which, in turn, are supported by the planet carrier. Bearings of the planet wheels can be rolling-bearings or slide-bearings. In many planetary gears, a planet carrier comprises a first end-section having first holes for first ends of planet wheel shafts and a second end-section having second holes for second ends of the planet wheel shafts. Furthermore, the planet carrier may comprise axial support-sections connected to the first and second end-sections. When a planetary gear is loaded so that torque is directed to the planet carrier, the above-mentioned first and second end-sections of the planet carrier are twisted with respect to each other. The twisting deformation of the planet carrier leads to a situation where geometric axes of rotation of the planet wheels are skewed with respect to the axial direction of the planetary gear. The skewedness of the geometric axes of rotation impairs the meshing between the planet wheels and the sun wheel as well as the meshing between the planet wheels and the gear ring. As a corollary, the skewedness of the geometric axes of rotation may shorten the life-time of the planetary gear. Furthermore, the skewedness of the geometric axes of rotation requires skewedness compensation in the design of the planet wheels.

The above-mentioned twisting deformation of a planet carrier can be compensated for with planet wheel shafts that are more flexible near an end-section of the planet carrier that receives torque than near the other end-section of the planet carrier. Furthermore, the flexibility of the planet wheel shafts equalizes load sharing between planet wheels. The flexibility of the planet wheel shafts increases however material tensions occurring in the planet wheel shafts compared to material tensions occurring in more rigid planet wheel shafts. The increase in the material tensions decreases a torque transfer capacity of a planetary gear. If the torque transfer capacity is wanted to be improved, more expensive material needs to be used in the planet wheel shafts.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new planetary gear that comprises:
  a sun shaft comprising a sun wheel,
  a gear ring,
  a planet carrier,
  planet wheels meshing with the sun wheel and with the gear ring, and
  planet wheel shafts supporting the planet wheels rotatably with respect to the planet carrier.

Each of the planet wheel shafts is arranged to support a respective one of the planet wheels so that, in an unloaded situation, the geometric axis of rotation of the planet wheel under consideration is skewed with respect to the axial direction of the planetary gear whereas, in a loaded situation, the skewedness of the geometric axis of rotation of the planet wheel is at least partly eliminated by twisting deformation occurring in the planet carrier and caused by torque directed to the planet carrier.

Thus, in loaded situations, the direction of the geometric axis of rotation of each planet wheel can be closer to the axial direction than in conjunction with a planetary gear that comprises rigid planet wheel shafts that are axially directed in an unloaded situation. The fact that the directions of the geometric axes of rotation of the planet wheels can be closer to the axial direction in loaded situations lengthens the life-time of bearings of the planet wheels. Furthermore, the need for skewedness compensation in the design of the planet wheels is reduced. Material tensions occurring in planet wheel shafts of a planetary gear according to the invention can be smaller than material tensions in planet wheel shafts of a planetary gear where twisting deformation occurring in a planet carrier is compensated for by flexibility of the planet wheel shafts.

In accordance with the invention, there is provided also a new planet wheel shaft for a planetary gear. A planet wheel shaft according to the invention comprises:
  end-portions attachable to a planet carrier of the planetary gear, and
  a middle-portion for supporting a planet wheel of the planetary gear and defining a geometric axis of rotation of the planet wheel,
wherein the geometric axis of rotation is skewed with respect to a geometric straight line when the end-portions are situated with respect to each other so that geometric symmetry axes of the both end-portions coincide with the geometric straight line.

In accordance with the invention, there is provided also a new planet carrier for a planetary gear. A planet carrier according to the invention comprises:
  a first end-section having first holes for first ends of planet wheel shafts of the planetary gear,
  a second end-section having second holes for second ends of the planet wheel shafts of the planetary gear, and
  axial support-sections connected to the first and second end-sections,
wherein the first holes have a shift in a tangential direction of the planet carrier with respect to the second holes when the planet carrier is free from twisting deformation caused by torque directed to the planet carrier.

A planetary gear according to the invention can be implemented by using planet wheel shafts according to the invention and a planet carrier according to the prior art where holes for ends of each planet wheel shaft are not shifted in the tangential direction with respect to each other. It is also possible to implement a planetary gear according to the invention by using a planet carrier according to the invention and planet wheel shafts according to the prior art. Furthermore, it is also possible to implement a planetary gear according to the invention by using a planet carrier according to the invention and planet wheel shafts according to the invention.

Various exemplifying and non-limiting embodiments of the invention are described in accompanied dependent claims.

Exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
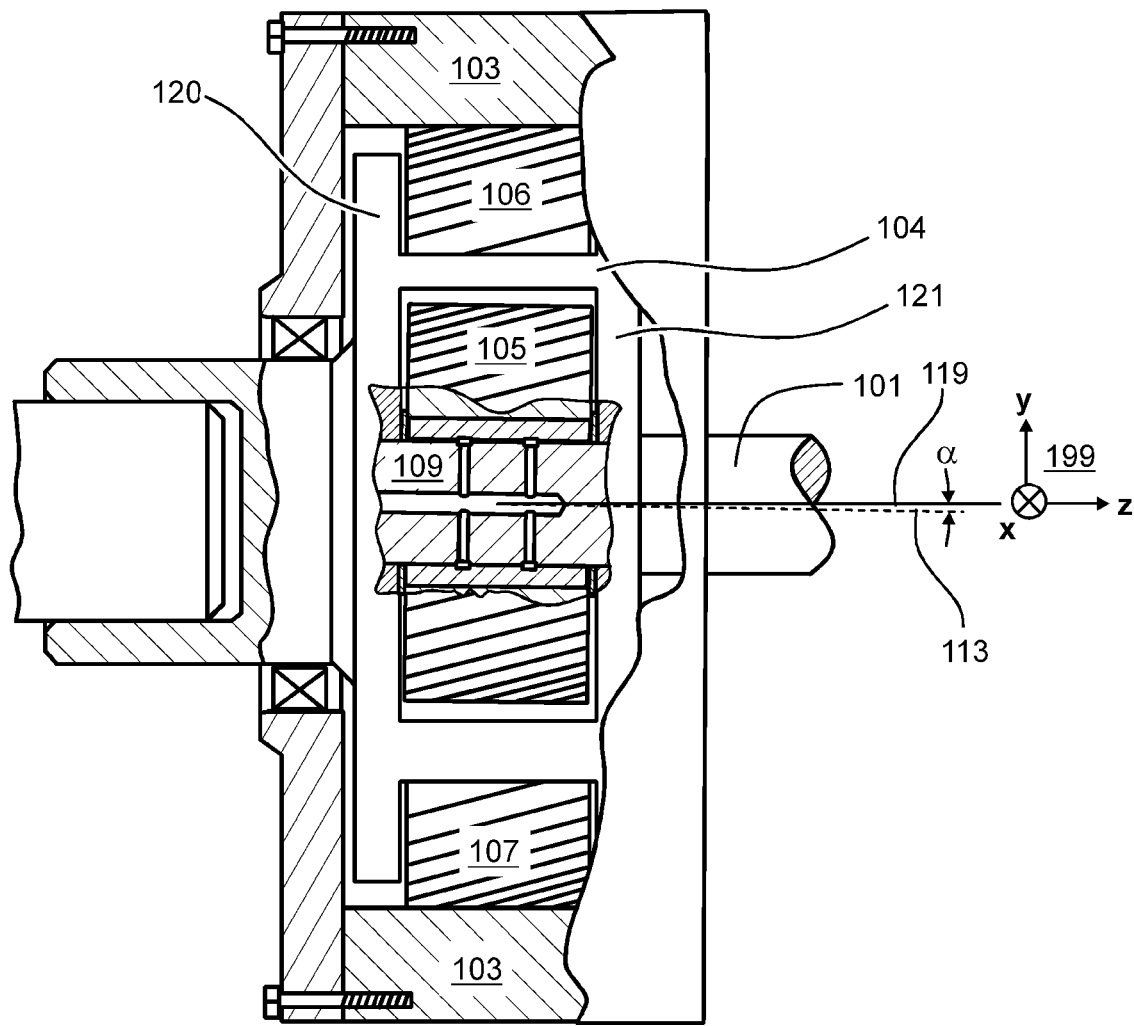
FIG. 1 illustrates a planetary gear according to an exemplifying and non-limiting embodiment.

FIG. 1 illustrates a planetary gear according to an exemplifying and non-limiting embodiment. The planetary gear comprises a sun shaft 101, a gear ring 103, a planet carrier 104, planet wheels, and planet wheel shafts rotatably supporting the planet wheels with respect to the planet carrier 104. The sun shaft 101 comprises a sun wheel, and the planet carrier 104 is arranged to support the planet wheels so that the planet wheels are meshing with the sun wheel and with the gear ring. The sun wheel is not shown in FIG. 1. In FIG. 1, three of the planet wheels are denoted with references 105, 106, and 107. The planet wheel 105 is presented as a partial section view so that FIG. 1 shows a part of a section view of a planet wheel shaft 109 that supports the planet wheel 105. Each of the planet wheel shafts is arranged to rotatably support a respective one of the planet wheels so that, in an unloaded situation, the geometric axis of rotation of the planet wheel under consideration is skewed with respect to the axial direction of the planetary gear. The axial direction is parallel with the z-axis of a coordinate system 199. In FIG. 1, the geometric axis of rotation of the planet wheel 105 is depicted with a dashed line 113. A geometric straight line 119 is parallel with the axial direction. FIG. 1 illustrates the planetary gear in an unloaded situation where there is an angle α between the geometric axis of rotation 113 and the axial direction. The angle α can be for example within a range from 0.005 degrees to 0.3 degrees, or within a range from 0.03 degrees to 0.3 degrees. In a loaded situation, the skewedness of the geometric axis of rotation 113 is at least partly eliminated by twisting deformation occurring in the planet carrier 104 and caused by torque directed to the planet carrier so that a first end-section 120 of the planet carrier 104 is twisted with respect to a second end-section 121 of the planet carrier 104. It is assumed that the direction of the torque is such that the first end-section 120 is twisted clockwise with respect to a second end-section 121 when the first end-section 120 is seen along a positive z-direction of the coordinate system 199.

Figure 2A:
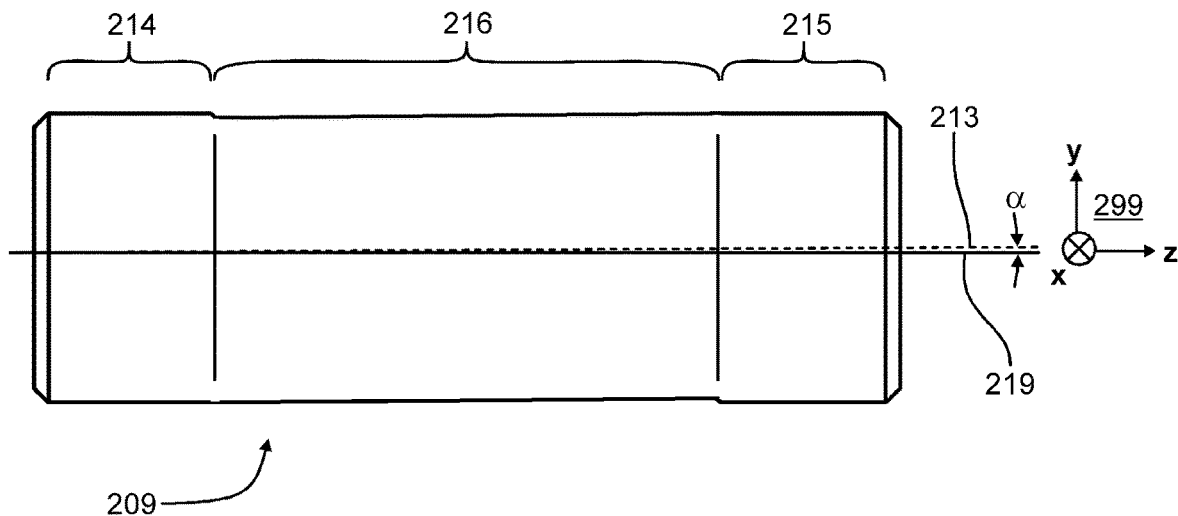
FIGS. 2a, 2b, and 2c illustrate planet wheel shafts according to exemplifying and non-limiting embodiments.

FIG. 2a illustrates a planet wheel shaft 209 according to an exemplifying and non-limiting embodiment. The planet wheel shaft 209 comprises end-portions 214 and 215 attachable to a planet carrier of a planetary gear. The axial direction of the planetary gear is parallel with the z-direction of a coordinate system 299. The planet wheel shaft 209 comprises a middle-portion 216 for supporting a planet wheel of the planetary gear and defining a geometric axis of rotation of the planet wheel. In FIG. 2a, the geometric axis of rotation is depicted with a dashed line 213. The geometric axis of rotation 213 is skewed with respect to a geometric straight line 219 when the end-portions 214 and 215 are situated with respect to each other so that geometric symmetry axes of the end-portions 214 and 215 coincide with the geometric straight line 219. In FIG. 2a, the skewedness of the geometric axis of rotation 213 with respect to the geometric straight line 219 is depicted with an angle α than can be for example within the range from 0.005 degrees to 0.3 degrees, or within a range from 0.03 degrees to 0.3 degrees. In the exemplifying planet wheel shaft 209, the geometric symmetry axes of the end-portions 214 and 215 coincide with the geometric straight line 219 when the planet wheel shaft 209 is free from shape deformations. In other words, FIG. 2a shows the planet wheel shaft 209 in a situation where no external forces are acting on the planet wheel shaft 209.

Figure 2B:
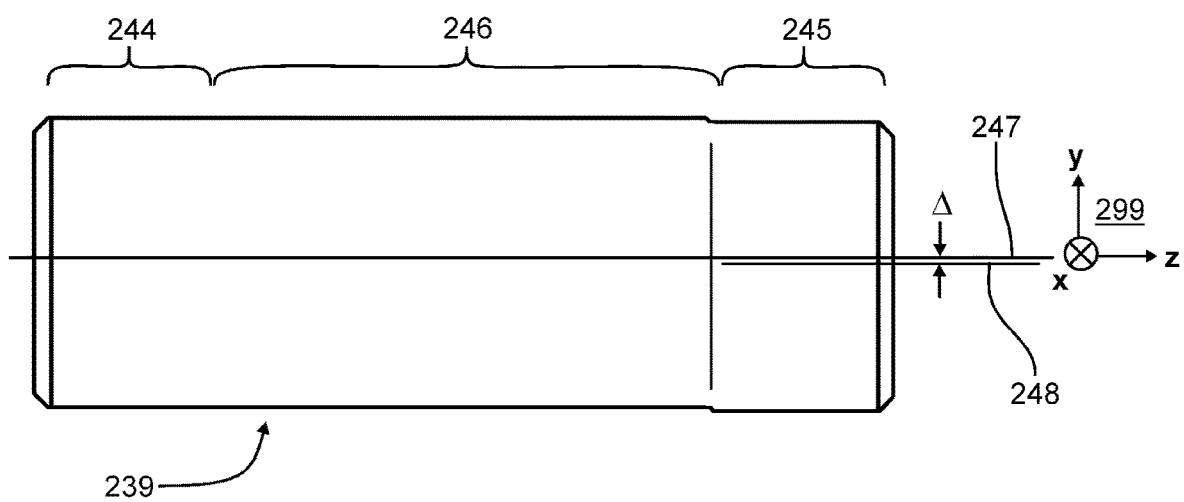
Figure 2C:
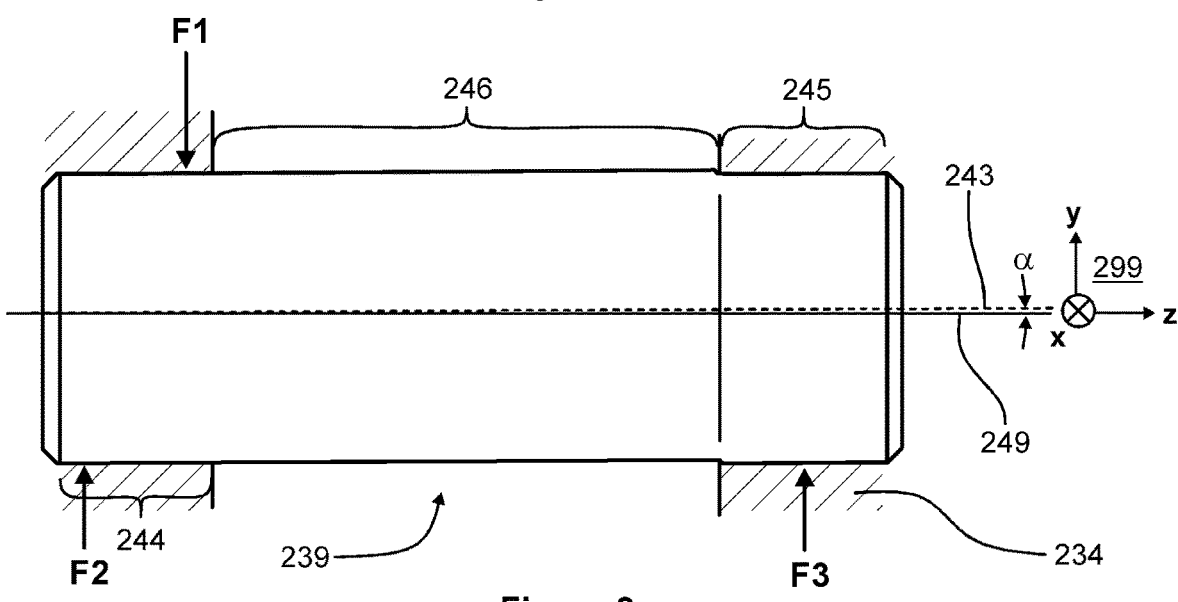

FIGS. 2b and 2c illustrate a planet wheel shaft 239 according to another exemplifying and non-limiting embodiment. The planet wheel shaft 239 comprises end-portions 244 and 245 attachable to a planet carrier of a planetary gear. The planet wheel shaft 239 comprises a middle-portion 246 for supporting a planet wheel of the planetary gear and defining a geometric axis of rotation of the planet wheel. FIG. 2b shows the planet wheel shaft 239 in a situation where no external forces are acting on the planet wheel shaft 239 and thus the planet wheel shaft 239 is free from shape deformations. As shown in FIG. 2b, geometric symmetry axes 247 and 248 of the end-portions 244 and 245 are parallel with each other and a distance A away from each other when the planet wheel shaft 239 is free from shape deformations. FIG. 2c shows the planet wheel shaft 239 in a situation where the planet wheel shaft 239 has been installed on a planet carrier 234 that directs, to the planet wheel shaft 239, support forces deforming the planet wheel shaft 239 so that the geometric symmetry axes of the end-portions 244 and 245 coincide with a geometric straight line 249 that is parallel with the axial direction of the planetary gear. In FIG. 2c, some of the support forces are depicted with arrows F1, F2, and F3. As illustrated in FIG. 2c, the geometric axis of rotation 243 defined by the middle-portion 246 is skewed with respect to the geometric straight line 249 when the planet wheel shaft 239 is deformed in the above-mentioned way so that the geometric symmetry axes of the end-portions 244 and 245 coincide with the geometric straight line 249. In FIG. 2c, the skewedness of the geometric axis of rotation 243 with respect to the geometric straight line 249 is depicted with an angle α than can be for example within the range from 0.005 degrees to 0.3 degrees, or within a range from 0.03 degrees to 0.3 degrees.

The planet wheel shafts of the planetary gear shown in FIG. 1 can be for example such as the planet wheel shaft 209 shown in FIG. 2a or the planet wheel shaft 239 shown in FIGS. 2b and 2c. In an exemplifying case where the planet wheel shafts are such as the planet wheel shaft 239, each of the planet wheel shafts is prestressed in an unloaded situation where the planet carrier 104 is free from twisting deformation caused by torque directed to the planet carrier. In a loaded situation, the prestress of each planet wheel shaft is reduced in a response to the twisting deformation of the planet carrier. This phenomenon reduces the total material tensions taking place in the planet wheel shafts in the loaded situation.

Figure 3A:
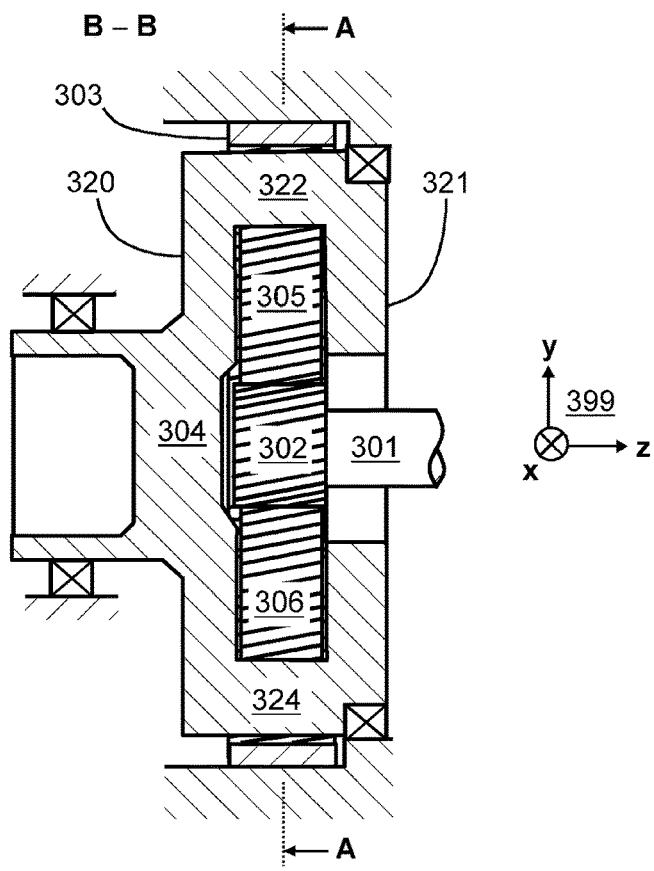
FIGS. 3a, 3b, 3c, and 3d illustrate a planetary gear comprising a planet carrier according to an exemplifying and non-limiting embodiment.
Figure 3B:
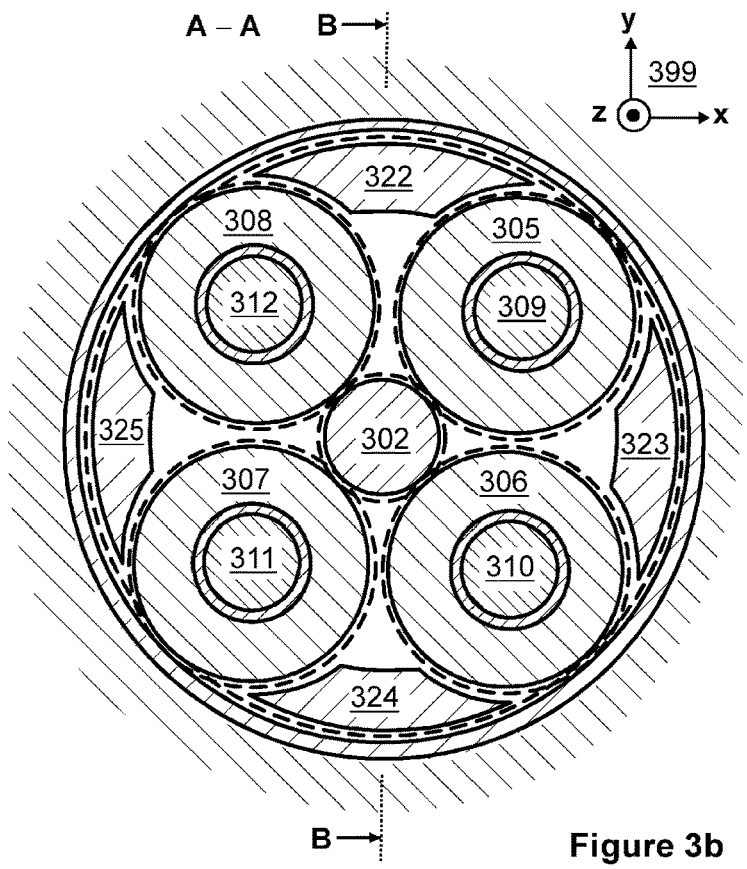

FIGS. 3a and 3b illustrate a planetary gear that comprises a planet carrier 304 according to an exemplifying and non-limiting embodiment. FIG. 3a shows a view of a section taken along a geometric line B-B shown in FIG. 3b. The geometric section plane is parallel with the yz-plane of a coordinate system 399. FIG. 3b shows a view of a section taken along a geometric line A-A shown in FIG. 3a. The geometric section plane is parallel with the xy-plane of the coordinate system 399. The planetary gear comprises a sun shaft 301, a gear ring 303, the planet carrier 304, planet wheels 305, 306, 307, and 308, and planet wheel shafts 309, 310, 311, and 312 rotatably supporting the planet wheels with respect to the planet carrier 304. The sun shaft 301 comprises a sun wheel 302, and the planet carrier 304 is arranged to support the planet wheels so that the planet wheels are meshing with the sun wheel 302 and with the gear ring 303. Each of the planet wheel shafts is arranged to rotatably support a respective one of the planet wheels so that, in an unloaded situation, the geometric axis of rotation of the planet wheel under consideration is skewed with respect to the axial direction of the planetary gear. The axial direction is parallel with the z-axis of a coordinate system 399. In a loaded situation, the skewedness of the geometric axis of rotation of each planet wheel is at least partly eliminated by twisting deformation taking place in the planet carrier 304 and caused by torque directed to the planet carrier.

Figure 3C:
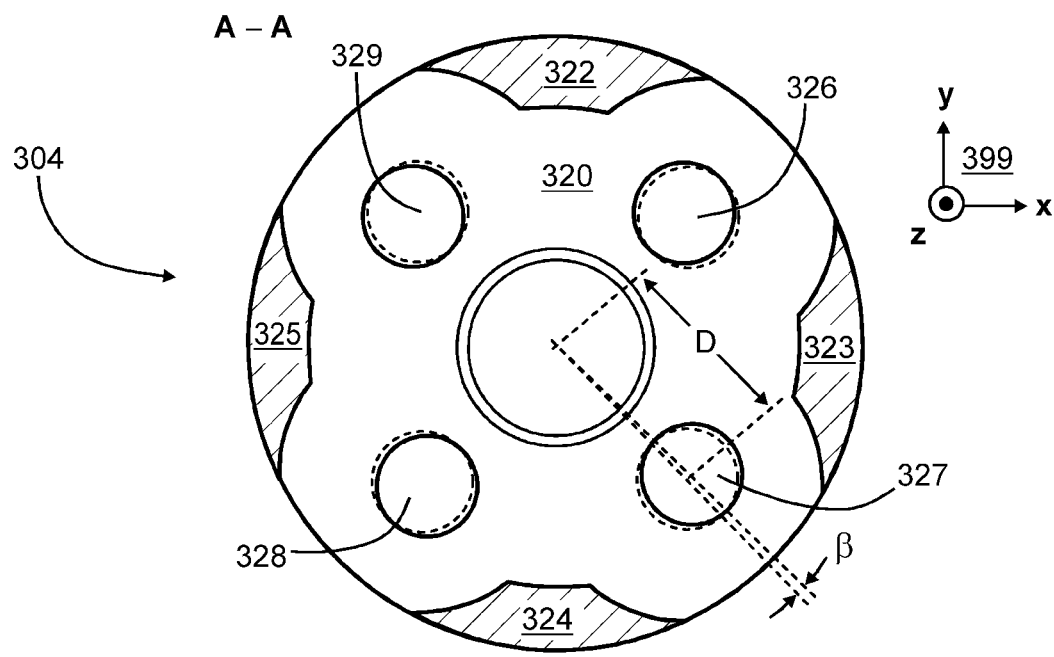
Figure 3D:
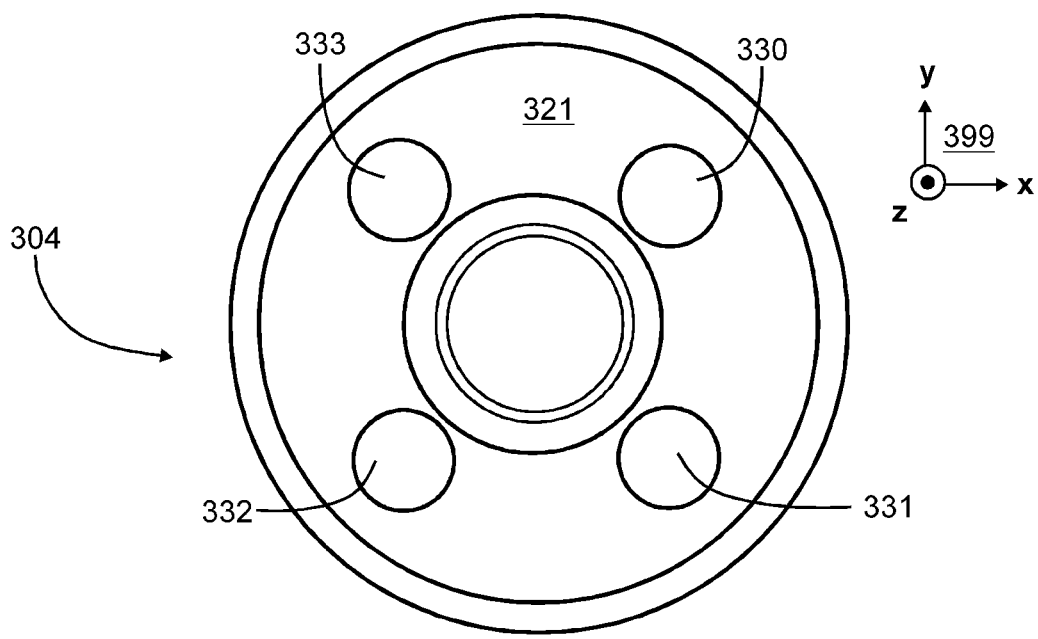

FIG. 3c shows a section view of the planet carrier 304 when the section is taken along the geometric line A-A shown in FIG. 3a. The geometric section plane is parallel with the yz-plane of the coordinate system 399. FIG. 3d shows the planet carrier 304 when seen along the negative z-direction of the coordinate system 399. The planet carrier 304 comprises a first end-section 320 having first holes 326, 327, 328, and 329 for first ends of planet wheel shafts 309-312. The planet carrier 304 comprises a second end-section 321 having second holes 330, 331, 332, and 333 for second ends of the planet wheel shafts. Furthermore, the planet carrier 304 comprises axial support-sections 322, 323, 324, and 325 connected to the first and second end-sections 320 and 321. The above-mentioned first holes 326-329 have a shift in a tangential direction, i.e. in a circumferential direction, of the planet carrier 304 with respect to the second holes 330-333 when the planet carrier is free from twisting deformation caused by torque directed to the planet carrier i.e. when no torque is directed to the planet carrier. The shift of the first holes 326-329 in the tangential direction with respect to the second holes 330-333 is illustrated in FIG. 3c so that the places of the second holes 330-333 are depicted with dashed line circles. A shift-angle β of the first holes with respect to the second holes can be for example within the range from 0.005 degrees to 0.3 degrees, or within a range from 0.03 degrees to 0.3 degrees. The shift-angle β is illustrated in FIG. 3c. The shift in the tangential direction is determined by the shift-angle β and a distance D from the geometric symmetry axis of the sun shaft of the planetary gear to the geometric symmetry axes of the planet wheel shafts. It is to be noted that the above-mentioned holes for the ends of the planet wheel shafts are not necessarily through holes in the both first and second end-sections 320 and 321.

In some exemplifying cases, a planet carrier according to an exemplifying and non-limiting embodiment can be a planet carrier of a planetary gear where bearings of planet wheels are between the ends of planet wheel shafts and the planet carrier. In these exemplifying cases, the holes of the planet carrier for the ends of the planet wheel shafts are holes for the ends of the planet wheel shafts when the ends of the planet wheel shafts are provided with bearing elements or the ends of the planet wheel shafts are capable of acting as parts of slide-bearings.

In the exemplifying planetary gears illustrated in FIGS. 1 and 3a-3d, the bearings of the planet wheels are slide-bearings. An advantage of slide-bearings with respect to rolling-bearings is that slide-bearings require less room in the radial direction and the load carrying surfaces of slide-bearings can be larger than those of rolling-bearings. It is however also possible that a planetary gear according to an embodiment of the invention comprises rolling-bearings, e.g. a pair of conical roller bearings in the O-configuration. Therefore, it is to be noted that the invention is applicable with different types of bearings of planet wheels.

In the exemplifying planetary gears illustrated in FIGS. 1 and 3a-3d, the gear ring is stationary, and the planet carrier and the sun shaft are rotatable. It is also possible that for example the sun shaft is stationary, and the planet wheel carrier and the gear ring are rotatable.

The specific examples provided in the description given above should not be construed as limiting the scope and/or the applicability of the accompanied claims.

Lists and groups of examples provided in the description given above are not exhaustive unless otherwise explicitly stated.

What is claimed is:

1. A planetary gear comprising:
a sun shaft comprising a sun wheel,
a gear ring,
a planet carrier,
planet wheels meshing with the sun wheel and with the gear ring, and
planet wheel shafts supporting the planet wheels rotatably with respect to the planet carrier,
wherein each of the planet wheel shafts is arranged to support a respective one of the planet wheels so that, in an unloaded situation, a geometric axis of rotation of the planet wheel under consideration is skewed with respect to an axial direction of the planetary gear, and, in a loaded situation, the skewedness of the geometric axis of rotation of the planet wheel is at least partly eliminated by twisting deformation occurring in the planet carrier and caused by torque directed to the planet carrier, and wherein each of the planet wheel shafts comprises a first end portion and a second end portion attached to the planet carrier and a middle-portion supporting a respective one of the planet wheels and defining the geometric axis of rotation of the planet wheel, the geometric axis of rotation being skewed with respect to the axial direction when geometric symmetry axes of the end-portions coincide with each other and are parallel with the axial direction.

2. A planetary gear according to claim 1, wherein each of the planet wheel shafts is prestressed in the unloaded situation where the planet carrier is free from the twisting deformation caused by torque directed to the planet carrier, and, in the loaded situation, prestress of each of the planet wheel shafts is reduced in a response to the twisting deformation of the planet carrier.

3. A planetary gear according to claim 2, wherein an angle between the geometric axis of rotation of the planet wheel and the axial direction of the planetary gear is, in the unloaded situation, within a range from 0.005 degrees to 0.3 degrees.

4. A planetary gear according to claim 2, wherein the planet carrier comprises a first end-section having first holes for the first end portions of the planet wheel shafts, a second end-section having second holes the second end-portions of the planet wheel shafts, and axial support-sections connected to the first and second end-sections, the first holes having a shift in a tangential direction of the planet carrier with respect to the second holes when the planet carrier is free from the twisting deformation.

5. A planetary gear according to claim 1, wherein an angle between the geometric axis of rotation of the planet wheel and the axial direction of the planetary gear is, in the unloaded situation, within a range from 0.005 degrees to 0.3 degrees.

6. A planetary gear according to claim 1, wherein the geometric symmetry axes of the end-portions coincide with each other and are parallel with the axial direction and the geometric axis of rotation defined by the middle-portion is skewed with respect to the axial direction when the planet wheel shaft is free from shape deformations.

7. A planetary gear according to claim 1, wherein the geometric symmetry axes of the end-portions are parallel with each other and a distance away from each other when the planet wheel shaft is free from shape deformations, the geometric axis of rotation defined by the middle-portion being skewed with respect to the axial direction when the planet wheel shaft is deformed so that the geometric symmetry axes of the end-portions coincide with each other and are parallel with the axial direction.

8. A planetary gear according to claim 1, wherein the planet carrier comprises a first end-section having first holes for the first end portions of the planet wheel shafts, a second end-section having second holes for the second end-portions of the planet wheel shafts, and axial support-sections connected to the first and second end-sections, the first holes having a shift in a tangential direction of the planet carrier with respect to the second holes when the planet carrier is free from the twisting deformation.

9. A planet wheel shaft for a planetary gear, the planet wheel shaft being a single piece of material and comprising:
  end-portions attachable to a planet carrier of the planetary gear, and
  a middle-portion for supporting a planet wheel of the planetary gear and defining a geometric axis of rotation of the planet wheel,
  wherein the geometric axis of rotation is skewed with respect to a geometric straight line when the end-portions are situated with respect to each other so that geometric symmetry axes of the end-portions coincide with the geometric straight line, and
  wherein the geometric symmetry axes of the end-portions coincide with the geometric straight line and the geometric axis of rotation defined by the middle-portion is skewed with respect to the geometric straight line when the planet wheel shaft is free from shape deformations.

10. A planet wheel shaft according to claim 9, wherein an angle between the geometric axis of rotation and the geometric straight line is within a range from 0.005 degrees to 0.3 degrees when the end-portions are situated with respect to each other so that the geometric symmetry axes of the end-portions coincide with the geometric straight line.

11. A planet wheel shaft for a planetary gear, the planet wheel shaft being a single piece of material and comprising:
  end-portions attachable to a planet carrier of the planetary gear, and
  a middle-portion for supporting a planet wheel of the planetary gear and defining a geometric axis of rotation of the planet wheel,
  wherein the geometric axis of rotation is skewed with respect to a geometric straight line when the end-portions are situated with respect to each other so that geometric symmetry axes of the end-portions coincide with the geometric straight line, and
  wherein the geometric symmetry axes of the end-portions are parallel with each other and a distance away from each other when the planet wheel shaft is free from shape deformations, the geometric axis of rotation defined by the middle-portion being skewed with respect to the geometric straight line when the planet wheel shaft is deformed so that the geometric symmetry axes of the both end-portions coincide with the geometric straight line.

12. A planetary gear comprising:
  a sun shaft comprising a sun wheel;
  a gear ring;
  a planet carrier;
  planet wheels meshing with the sun wheel and with the gear ring; and
  planet wheel shafts supporting the planet wheels rotatably with respect to the planet carrier,
  wherein the planet carrier comprises:
    a first end-section having first holes containing first ends of the planet wheel shafts,
    a second end-section having second holes containing second ends of the planet wheel shafts, and
    axial support-sections connected to the first and second end-sections,
    wherein the first holes have a shift in a tangential direction of the planet carrier with respect to the second holes when the planet carrier is free from twisting deformation caused by torque directed to the planet carrier.

13. A planetary gear according to claim 12, wherein a shift-angle of the first holes with respect to the second holes is within a range from 0.005 degrees to 0.3 degrees, the shift in the tangential direction being determined by the shift-angle and by a distance from a geometric symmetry axis of the sun shaft of the planetary gear to geometric symmetry axes of the planet wheel shafts of the planetary gear.

* * * * *